United States Patent
Shkunov et al.

(10) Patent No.: US 8,675,694 B2
(45) Date of Patent: Mar. 18, 2014

(54) MULTI-MEDIA RAMAN RESONATORS AND RELATED SYSTEM AND METHOD

(75) Inventors: Vladimir V. Shkunov, San Pedro, CA (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 24 days.

(21) Appl. No.: 13/397,987

(22) Filed: Feb. 16, 2012

(65) Prior Publication Data

US 2013/0215912 A1    Aug. 22, 2013

(51) Int. Cl.
*H01S 3/30* (2006.01)

(52) U.S. Cl.
USPC .............................................................. 372/3

(58) Field of Classification Search
USPC .................................................................. 372/3
See application file for complete search history.

(56) References Cited

U.S. PATENT DOCUMENTS

| | | | |
|---|---|---|---|
| 4,000,416 A | 12/1976 | Goell | |
| 4,103,179 A * | 7/1978 | Schmidt | 359/327 |
| 4,324,491 A * | 4/1982 | Hueber | 356/139.08 |
| 4,458,994 A | 7/1984 | Jain et al. | |
| 4,538,274 A * | 8/1985 | George | 372/3 |
| 4,618,783 A * | 10/1986 | Pradere et al. | 359/327 |
| 4,821,272 A | 4/1989 | Bruesselbach et al. | |
| 5,062,112 A | 10/1991 | Buchman et al. | |
| 5,090,016 A | 2/1992 | Dewhirst et al. | |
| 5,153,887 A * | 10/1992 | Krapchev | 372/3 |
| 5,673,281 A * | 9/1997 | Byer | 372/3 |
| 5,734,773 A | 3/1998 | Teshima et al. | |
| 5,848,215 A | 12/1998 | Akasaka et al. | |
| 5,851,259 A | 12/1998 | Clayton et al. | |
| 6,407,855 B1 | 6/2002 | MacCormack et al. | |
| 6,529,464 B2 | 3/2003 | Wilde et al. | |
| 6,542,683 B1 | 4/2003 | Evans et al. | |
| 6,580,860 B1 | 6/2003 | Varner | |
| 6,751,240 B2 * | 6/2004 | Arisawa et al. | 372/3 |
| 7,010,195 B2 | 3/2006 | Westbrook | |
| 7,072,367 B2 * | 7/2006 | Arisawa et al. | 372/3 |
| 7,120,323 B2 | 10/2006 | Dyott et al. | |

(Continued)

FOREIGN PATENT DOCUMENTS

EP     1 081 813 A2   3/2001
WO   WO 2011/146407 A2   11/2011

OTHER PUBLICATIONS

David A. Rockwell, et al., "Compact Raman Generators", U.S. Appl. No. 13/476,687, filed May 21, 2012.

(Continued)

*Primary Examiner* — Kinam Park (57) ABSTRACT

A system includes a laser configured to generate a pump beam at a pump wavelength. The system also includes a multi-media Raman resonator configured to receive the pump beam and generate an output beam. The multi-media Raman resonator includes multiple mirrors and multiple Raman media optically located between the mirrors. Output power in the output beam is spectrally concentrated around a single dominant wavelength that is longer than a pump wavelength. The longer wavelength of the output beam is associated with a combination of at least one Stokes shift associated with each of the individual Raman media. A filter could be configured to absorb light at a wavelength that is absorbed by one of the Raman media or to redirect light at the wavelength absorbed by one of the Raman media away from that Raman medium.

20 Claims, 4 Drawing Sheets

(56) References Cited

U.S. PATENT DOCUMENTS

| | | | |
|---|---|---|---|
| 7,804,863 B2 * | 9/2010 | Adel et al. | 372/3 |
| 7,983,312 B2 | 7/2011 | Shkunov et al. | |
| 8,036,252 B2 * | 10/2011 | Islam | 372/3 |
| 2004/0190825 A1 | 9/2004 | Kang et al. | |
| 2004/0233941 A1 | 11/2004 | Fajardo et al. | |
| 2005/0111803 A1 | 5/2005 | Bickham | |
| 2008/0131065 A1 | 6/2008 | Windeler et al. | |
| 2008/0226241 A1 | 9/2008 | Sugizaki et al. | |
| 2008/0259969 A1 * | 10/2008 | Piper et al. | 372/3 |
| 2010/0044102 A1 | 2/2010 | Rinzler et al. | |
| 2010/0189392 A1 | 7/2010 | Rockwell et al. | |
| 2010/0195194 A1 | 8/2010 | Chen et al. | |
| 2011/0128538 A1 | 6/2011 | Cerullo et al. | |
| 2011/0218431 A1 | 9/2011 | Fink et al. | |
| 2011/0306956 A1 | 12/2011 | Islam | |
| 2012/0236881 A1 | 9/2012 | Nikolajsen et al. | |
| 2012/0263196 A1 * | 10/2012 | Pask et al. | 372/3 |
| 2012/0275475 A1 | 11/2012 | Shkunov et al. | |
| 2013/0020486 A1 | 1/2013 | Zhang et al. | |
| 2013/0043392 A1 * | 2/2013 | Mildren | 250/341.1 |

OTHER PUBLICATIONS

Notification of transmittal of the International Search Report and the Written Opinion of the International Searching Authority, or the Declaration dated Feb. 15, 2011 in connection with International Patent Application No. PCT/US2012/069279.

Notification of Transmittal of the International Search Report and the Written Opinion of the International Searching Authority, or the Declaration dated Jul. 26, 2013 in connection with International Patent Application No. PCT/US13/25395.

Notification of Transmittal of the International Search Report and the Written Opinion of the International Searching Authority, or the Declaration dated May 30, 2013 in connection with International Patent Application No. PCT/US13/25404.

Notification of Transmittal of the International Search Report and the Written Opinion of the International Searching Authority, or the Declaration dated May 10, 2013 in connection with International Patent Application No. PCT/US2013/028923.

* cited by examiner

MULTI-MEDIA RAMAN RESONATORS AND RELATED SYSTEM AND METHOD

TECHNICAL FIELD

This disclosure is directed in general to laser systems. More specifically, this disclosure is directed to multi-media Raman resonators and a related system and method.

BACKGROUND

Stimulated Raman scattering (SRS) describes a process in crystals or other classes of Raman media where power from a pump laser's initial wavelength is converted to a longer wavelength. The specific change in wavelength corresponds to an integral number of "Stokes" frequency shifts that are characteristic of a particular Raman medium. Efficient single or multiple Stokes shifts have been demonstrated with a large number of individual Raman media. If the pump laser happens to be tunable, the SRS process can shift the tunability from the pump laser's wavelength range to a longer wavelength range.

SUMMARY

This disclosure provides multi-media Raman resonators and a related system and method.

In a first embodiment, a laser system includes a multi-media Raman resonator configured to receive a pump beam and generate an output beam. The multi-media Raman resonator includes multiple mirrors and multiple Raman media optically located between the mirrors. Output power in the output beam is spectrally concentrated around a single dominant wavelength that is longer than a pump wavelength. The longer wavelength of the output beam is associated with a combination of at least one Stokes shift associated with each of the individual Raman media.

In a second embodiment, a system includes a laser configured to generate a pump beam at a pump wavelength. The system also includes a multi-media Raman resonator configured to receive the pump beam and generate an output beam. The multi-media Raman resonator includes multiple mirrors and multiple Raman media optically located between the mirrors. Output power in the output beam is spectrally concentrated around a single dominant wavelength that is longer than a pump wavelength. The longer wavelength of the output beam is associated with a combination of at least one Stokes shift associated with each of the individual Raman media.

In a third embodiment, a method includes receiving a pump beam at a pump wavelength and generating an output beam using a multi-media Raman resonator. The multi-media Raman resonator includes multiple mirrors and multiple Raman media optically located between the mirrors. Output power in the output beam is spectrally concentrated around a single dominant wavelength that is longer than a pump wavelength. The longer wavelength of the output beam is associated with a combination of at least one Stokes shift associated with each of the individual Raman media.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
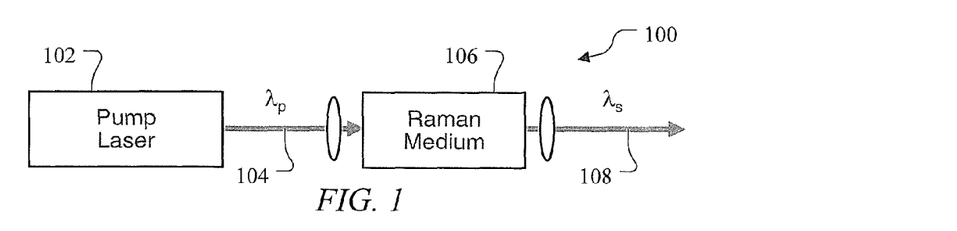
FIG. 1 illustrates a Raman generator.

FIG. 1 illustrates a Raman generator 100. Conceptually, the simplest approach for achieving Raman wavelength conversion is to use a Raman generator such as the one shown in FIG. 1. As shown here, a laser 102 launches a pump beam 104 at wavelength $\lambda_p$ into a Raman medium 106. A Stokes-shifted beam 108 at wavelength $\lambda_s$ builds up from spontaneous Raman scattering and exits the Raman medium 106. For long enough path lengths, at least 50% of the pump energy can be converted from the pump wavelength $\lambda_p$ to the longer Stokes-shifted wavelength $\lambda_s$.

Unfortunately, the available Raman media for mid-infrared wavelength generation often require path lengths of several meters for acceptable Raman conversion efficiency. This presents a practical problem, since typical crystalline Raman media can have much shorter maximum crystal lengths, such as about 10 cm. As a result, a single pass through a single crystal is typically well below the threshold length and of essentially no utility in certain applications. While a long string of Raman crystals can be used along with relay optics between crystals to convey optical beams from one crystal to the next, this would be large, very complex, and subject to multiple misalignment degrees of freedom.

Figure 2:
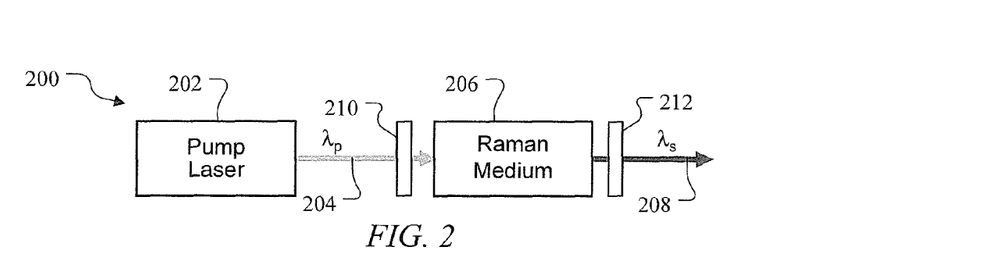
FIG. 2 illustrates a Raman resonator.

FIG. 2 illustrates a Raman resonator 200. Again, a laser 202 launches a pump beam 204 at wavelength $\lambda_p$ into a Raman medium 206, and a Stokes-shifted beam 208 at a longer wavelength $\lambda_s$ is output from the resonator 200. The Raman conversion builds up from spontaneous Raman scattering. Here, however, the Raman medium 206 is enclosed between two mirrors 210-212, which reflect light back and forth through the Raman medium 206. The mirrors 210-212 are designed so that the multiple passes overlap in the Raman medium 206, and the mirrors 210-212 reflect the Stokes-shifted wavelength as required. The mirror 210 is typically highly transmissive (such as about 100%) at the pump wavelength $\lambda_p$ and highly reflective (such as about 100%) at the Stokes-shifted wavelength $\lambda_s$. The mirror 212 is typically highly reflective (such as about 100%) at the pump wavelength $\lambda_p$ and has a lower partial reflectivity (such as about 30% to 60%) at the Stokes-shifted wavelength $\lambda_s$. The exact reflectivity for the mirror 212 can be selected to maximize the Raman conversion efficiency while avoiding practical issues such as optical damage. If the design is properly implemented, Raman conversion efficiencies of more than 50% can be achieved, and the Raman resonator 200 achieves this performance within a compact package.

Figure 3:
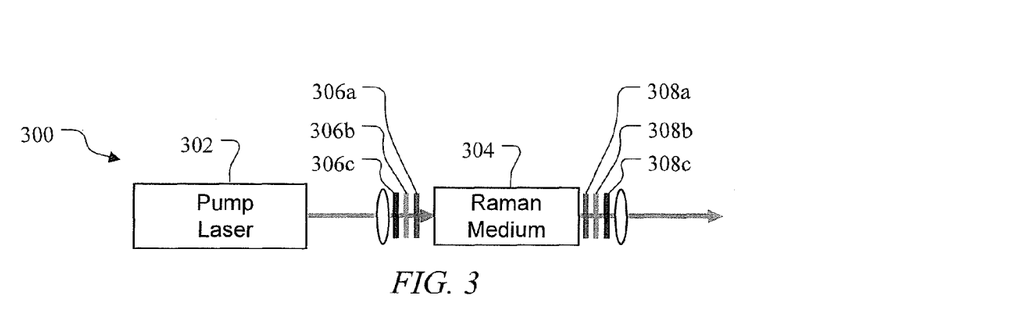
FIG. 3 illustrates a cascaded Raman resonator.

FIG. 3 illustrates a cascaded Raman resonator 300. Some applications may require multiple Stokes wavelength shifts. In this case, a cascaded Raman resonator such as the one shown in FIG. 3 can be used. Here, a laser 302 launches a pump beam at a Raman medium 304, where the Raman medium 304 is located between two sets of mirrors 306a-306c and 308a-308c. This multi-Stokes resonator 300 includes multiple Raman resonators comprising mirrors 306a-306c and 308a-308c that share the same physical Raman medium 304. In FIG. 3, three nested resonators are used, although a different number of nested resonators is possible.

Each nested resonator includes two mirrors, one on each side of the Raman medium 304. For example, a first nested resonator could include mirrors 306a and 308a, a second nested resonator could include mirrors 306b and 308b, and a third nested resonator could include mirrors 306c and 308c. The mirrors' reflectivities are optimized for specific Stokes-shifted wavelengths. For instance, in the first resonator, the mirrors 306a and 308a can be optimized to allow the pump beam to excite a first Stokes-shifted wavelength (S1) at a single Stokes shift from the pump wavelength and to contain the S1 power within the first resonator. When the S1 power rises to a sufficient level, the S1 beam functions as a pump for another Stokes shift, thereby exciting a second Stokes-shifted wavelength (S2) at two Stokes shifts from the pump wavelength. This second-Stokes generation is reinforced by the mirrors 306b and 308b in the second resonator, which are specified to operate at the S2 wavelength. In a similar manner, the S2 beam functions as a pump for a conversion to a third Stokes-shifted wavelength (S3), and the mirrors 306c and 308c of the third resonator are specified to optimize the build-up of the S3 power and to allow a portion of the S3 power to exit through the mirror 308c.

In addition to the potential for use in a small package, this approach provides higher efficiencies than some other approaches. One reason for the higher efficiency is that the approach shown in FIG. 3 only outcouples the final desired output wavelength S3. All lower-order Stokes-shifted wavelengths are efficiently retained within the resonator 300. Moreover, modeling and experiments show that the total power retained at the pump wavelength and the lower-order Stokes-shifted wavelengths can be very small, yielding multi-Stokes photon conversion efficiencies comparable to what is possible with a first-Stokes resonator. Consequently, this architecture is an excellent baseline choice for any Raman laser source requiring multiple Stokes wavelength shifts to cover a broad spectral range. However, a challenge arises when the Raman medium might be absorptive at the pump wavelength or any Stokes-shifted wavelength, in which case the absorption can terminate the wavelength cascade at the absorbing wavelength. Also, this approach can lead to gaps within certain wavelength ranges, which can be problematic in certain applications.

Figure 4:
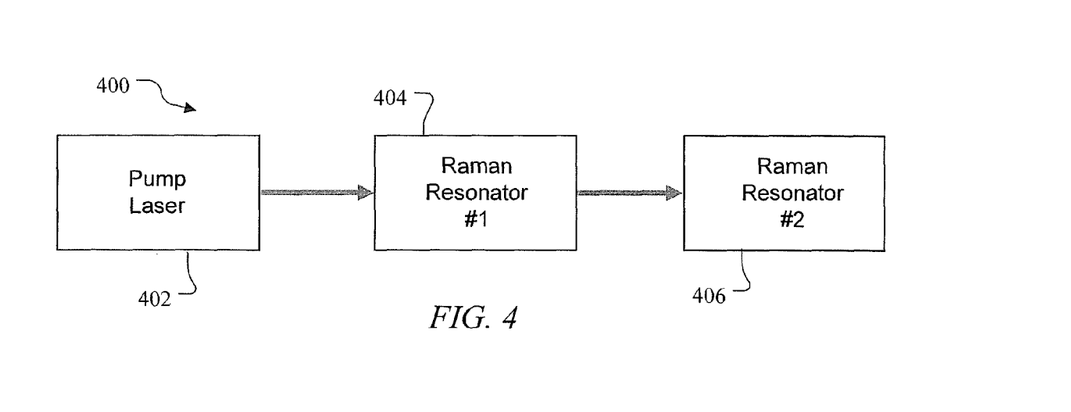
FIG. 4 illustrates a tandem Raman resonator.

FIG. 4 illustrates a tandem Raman resonator 400. Again, some applications may require multiple Stokes wavelength shifts, and a tandem Raman resonator such as the one shown in FIG. 4 can be used. The tandem configuration includes a series of two or more Raman resonators. The tandem Raman resonator 400 in FIG. 4 includes a laser 402 that launches a pump beam into a first Raman resonator 404, and the first Raman resonator 404 functions as a pump for a second Raman resonator 406. If any additional Raman resonators are used in the series, the prior Raman resonator in the chain acts as a pump for the next Raman resonator in the chain. The Raman resonators 404-406 in the chain can use the same Raman medium or different Raman media.

This tandem approach can produce cumulative multi-Stokes wavelength shifts, with a single Stokes shift from each resonator, but the overall conversion efficiency is low due to the cumulative losses of the individual resonators. For example, if a single Raman resonator achieves a 65% photon efficiency, the combination of three Raman resonators in series only achieves a photon efficiency of about 27%. If quantum-defect losses associated with generating longer-wavelength photons are accounted for, the overall power conversion efficiency can easily be around 10% or less, which is inadequate for many applications.

Moreover, this type of tandem approach has been used with different gasses as the Raman media in the Raman resonators 404-406. For example, hydrogen gas ($H_2$) and deuterium gas ($D_2$) can be used to generate all of the wavelengths possible with either gas by itself, as well as many additional wavelengths when one of the Stokes orders in one gas pumps another of the Stokes orders of the other gas. However, this approach suffers from two significant drawbacks. First, this approach is only viable if all Raman media are highly transmissive at all of the required wavelengths for that stage of the tandem chain (including the pump wavelength and all necessary Stokes-shifted wavelengths). This requirement is relatively simple to meet with gases, but it can be problematic with solid-state Raman media in the mid-infrared spectral region, which is one region of intense application interest. Second, this approach distributes the output power in a final output beam among a large number of wavelengths corresponding to various combinations of Stokes orders of the component gases. The multiple simultaneous wavelengths may be useful for some applications, but several applications of broad interest are better suited if a single wavelength is produced at a time.

In accordance with this disclosure, an approach is defined where multiple Raman media are utilized within a single Raman resonator. The single resonator can be designed to generate an output wavelength that corresponds to a specific number of Stokes shifts in each of the Raman media with essentially no output power at any other possible combination of Stokes shifts. This disclosure therefore describes how to generate an output beam where output power in the output beam is spectrally concentrated around a single dominant longer wavelength, where the longer wavelength is shifted relative to a pump wavelength by a combination of Raman shifts from two or more distinct Raman media in a single Raman resonator. Various multi-media Raman resonators described below maintain the efficiency advantages of the basic cascaded Raman resonator described above, regardless of the relative transmission properties of the media or the magnitudes of the Raman shifts.

In particular embodiments, this approach can be used with applications requiring multiple wavelengths in the mid-infrared wavelength range, roughly from 2 μm to 5 μm. For example, some applications may require only a few discrete wavelengths located in atmospheric transmission windows, while other applications may require continuous tuning throughout this range. Depending on the tuning range of a pump laser, it may well be that any single Raman medium operating in multiple Stokes orders might yield only sparse coverage of the total spectral range, leaving unfilled wavelength gaps that degrade system performance. In these situations, the gaps can be filled using a combination of single or multiple Stokes shifts from multiple Raman media. With a judicious choice of Raman media, wavelength gaps of one Raman medium can be addressed by additional cumulative Stokes shifts from a second Raman medium having a different characteristic Stokes frequency shift.

Figure 5:
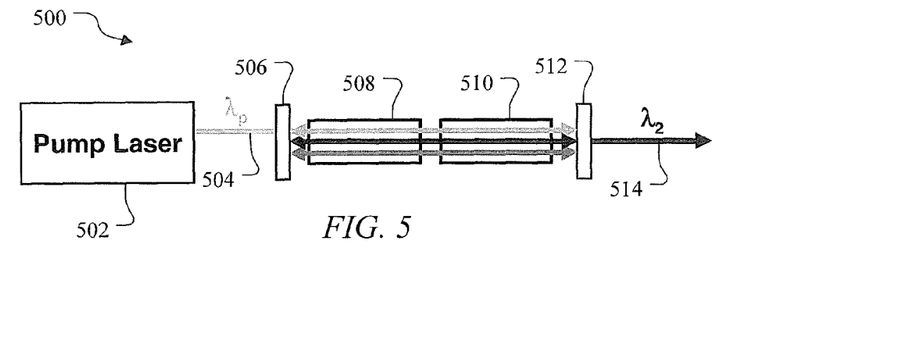
FIG. 5 illustrates a first example multi-media Raman resonator in accordance with this disclosure.

FIG. 5 illustrates a first example multi-media Raman resonator 500 in accordance with this disclosure. As shown in FIG. 5, a pump laser 502 provides a pump beam 504 having a pump wavelength $\lambda_p$. The pump laser 502 represents any suitable laser source configured to provide an output light beam at a desired wavelength or wavelengths.

The light in the pump beam 504 passes through a first mirror 506 and then through multiple Raman media 508-510. The pump light can also be reflected off a mirror 512 so that the light passes through the Raman media 508-510 a second time. The Raman media 508-510 are therefore optically located between the mirrors 506 and 512. Multiple beams or paths are shown between the mirrors 506 and 512 in FIG. 5. The double arrow for each path indicates that the pump beam 504 can experience multiple passes through the resonator, as could different Stokes-shifted beams. In this example, the pump beam 504 is originally at the pump wavelength $\lambda_p$, and it shifts to a first Stokes-shifted wavelength $\lambda_1$ produced by one of the Raman media. This Stokes-shifted beam is then shifted again to a second Stokes-shifted wavelength $\lambda_2$ produced by the other Raman medium before leaving the resonator 500 as a shifted output beam 514.

Each Raman medium 508-510 includes any suitable medium capable of changing the wavelength of light via stimulated Raman scattering. Each mirror 506 and 512 includes any suitable structure for reflecting and passing light of suitable frequencies/wavelengths. In this example, the mirror 506 is highly transmissive (such as about 100%) at the pump wavelength $\lambda_p$ and highly reflective (such as about 100%) at the Stokes-shifted wavelengths $\lambda_1$ and $\lambda_2$. Also, the mirror 512 is highly reflective (such as about 100%) at the pump wavelength $\lambda_p$ and the first Stokes-shifted wavelength $\lambda_1$ and has a lower partial reflectivity (such as about 30% to 60%) at the second Stokes-shifted wavelength $\lambda_2$. Coatings on the mirrors 506 and 512 help to define their reflective and transmissive characteristics. Spectral profiles of the mirror coatings also help to determine the final wavelength $\lambda_2$ of the shifted output beam 514. Note that each mirror 506 and 512 in FIG. 5 could represent a single mirror or a set of mirrors.

The Raman resonator 500 shown in FIG. 5 effectively includes two or more nested Raman resonators containing two or more Raman media. Each resonator includes a pair of mirrors, and the mirrors' reflectivities can be optimized for wavelengths corresponding to specific combinations of Stokes shifts from the Raman media 508-510. Again, note that the nested resonators could include the same mirrors or different mirrors in a set. As an example, one pair of mirrors might be optimized to allow the pump beam 504 to excite a first Stokes-shifted wavelength (S1) in the first Raman medium 508 but also to contain the S1 power within the resonator 500. When the S1 power rises to a sufficient level, the S1 beam functions as a pump for a second Stokes shift in the second Raman medium 510. Generation of this new wavelength can be reinforced by a pair of mirrors that are specified to operate at this two medium-shifted wavelength. Other wavelengths that could potentially be pumped by the S1 wavelength do not grow to any significant level because the mirrors 506 and 512 are designed not to provide a low threshold for these other wavelengths. The resonator 500 can also be optimized to provide other desired output wavelengths that are other combinations of various Stokes-order wavelength shifts from the available Raman media 508-510. In general, each Raman medium 508-510 could excite one or multiple Stokes shifts.

Figure 6:
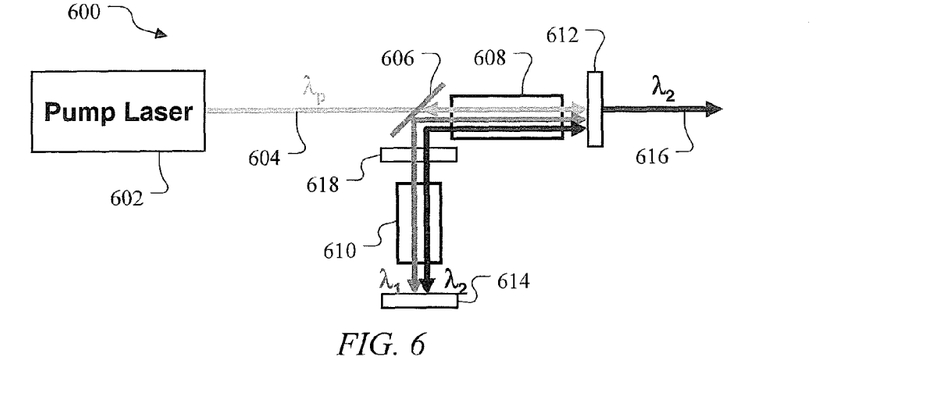
FIG. 6 illustrates a second example multi-media Raman resonator in accordance with this disclosure.

FIG. 6 illustrates a second example multi-media Raman resonator 600 in accordance with this disclosure. As shown in FIG. 6, a pump laser 602 provides a pump beam 604 having a pump wavelength $\lambda_p$. The pump laser 602 represents any suitable laser source configured to provide an output light beam at a desired wavelength or wavelengths. The Raman resonator 600 also includes a dichroic beamsplitter 606, two or more Raman media 608-610, and mirrors 612-614. The Raman media 608-610 are optically located between the mirrors 612-614. Again, multiple beams or paths with double arrows are shown between the mirrors 612-614, indicating that the pump beam 604 experiences multiple Stokes shifts and that the pump beam 604 and different Stokes-shifted beams can experience multiple passes through the resonator. In this example, the pump beam 604 is originally at the pump wavelength $\lambda_p$, and it undergoes a Stokes shift in the Raman medium 608 to wavelength $\lambda_1$ during one or more passes through the Raman media 608-610. It is then Stokes-shifted again, this time by the Raman medium 610, to a second wavelength $\lambda_2$ before leaving the resonator 600 as a shifted output beam 616.

During operation, the pump beam 604 is highly transmitted through the beamsplitter 606 and passes through the Raman medium 608 to the mirror 612. This mirror 612 is highly reflective (such as about 100%) at both $\lambda_p$ and $\lambda_1$, so this mirror 612 returns any unused pump power back to the Raman medium 608 for another chance at Raman conversion. The mirror 612 also functions as one of two resonator mirrors for the Raman resonator that generates $\lambda_1$. The Stokes-shifted light generated in the Raman medium 608 by the pump beam 604 passes back into the resonator, and it is deflected by the beamsplitter 606 toward the mirror 614. The mirror 614 provides high reflection (such as about 100%) at both Stokes-shifted wavelengths $\lambda_1$ and $\lambda_2$. As the power increases at $\lambda_1$, it begins to generate another Stokes shift at wavelength $\lambda_2$. This latter wavelength oscillates between the mirrors 612-614. The mirror 612 has a lower partial reflectivity (such as about 30% to 60%) at wavelength $\lambda_2$, and the reflectivity can be selected to optimize the performance of the resonator for the wavelength $\lambda_2$ and to allow for the creation of a useful laser output at wavelength $\lambda_2$.

In this example, the Raman medium 610 is absorptive at the pump wavelength $\lambda_p$, in which case the absorption can terminate the wavelength cascade at the absorbing wavelength. This is avoided in FIG. 6 by folding the resonator so that substantially all of the pump power reflected from the mirror 612 passes through the beamsplitter 606 and by inserting at least one filter 618 between the Raman medium 610 and the beamsplitter 606. The filter(s) 618 can help to redirect wavelengths that could be absorbed in the Raman medium 610 into one or more alternative optical paths, rather than being allowed to pass through the absorbing Raman medium 610. The filter(s) 618 could also absorb light at the wavelengths that could be absorbed in the Raman medium 610.

Each Raman medium 608-610 includes any suitable medium capable of changing the wavelength of light via stimulated Raman scattering. The dichroic beamsplitter 606 includes any suitable structure for splitting a beam of light. Each mirror 612-614 includes any suitable structure for reflecting and passing light of suitable frequencies/wavelengths. In this example, the mirror 612 is highly reflective (such as about 100%) at the pump wavelength $\lambda_p$ and the Stokes-shifted wavelength $\lambda_1$, and the mirror 612 has a lower partial reflectivity (such as about 30% to 60%) at the second Stokes-shifted wavelength $\lambda_2$. The mirror 614 is highly reflective (such as about 100%) at the Stokes-shifted wavelengths $\lambda_1$ and $\lambda_2$. For instance, the mirrors 612-614 can have coatings to support these features, and the coatings can have spectral profiles that determine the final wavelength $\lambda_2$ of the shifted output beam 616. Note that each mirror 612-614 in FIG. 6 could represent a single mirror or a set of mirrors. Also note that each Raman medium 608-610 could excite one or multiple Stokes shifts.

In particular embodiments, the Raman medium 608 could represent potassium gadolinium tungstate (KGW), and the Raman medium 610 could represent silicon. For a pump wavelength $\lambda_p$ of about 2 µm, a first-Stokes shift in the KGW Raman medium 608 generates an output wavelength $\lambda_1$ of about 2.4 µm. If the KGW Raman medium 608 pumps the silicon Raman medium 610, an additional Stokes shift in the Raman medium 610 generates an output wavelength $\lambda_2$ of about 2.9 µm. However, silicon strongly absorbs at the pump wavelength of 2 µm, mandating that the resonator 600 prevent any pump power at wavelength $\lambda_p$ from reaching the silicon Raman medium 610. Hence, in order to achieve the desired performance, the filter 618 can be used to prevent any pump power at the pump wavelength $\lambda_p$ from reaching the Raman medium 610. In practice, the coatings of the mirrors 612-614 can be selected to optimize the conversion efficiency into the final output wavelength $\lambda_2$ while maintaining intra-cavity intensities within the resonator 600 at levels consistent with reliable operation without optical damage. These specifications can initially be determined using a Raman conversion theoretical model and then empirically optimized by experimental studies.

Note that if there is a requirement for a second-Stokes shift in the Raman medium 608, this could be accommodated in at least two ways. First, the beamsplitter 606 could be modified so that the first-Stokes shift from the Raman medium 608 passes through the beamsplitter 606, and an additional mirror could be inserted between the beamsplitter 606 and the pump laser 602 to form a first-Stokes resonator with the mirror 612. The beamsplitter 606 could then be selected to be highly reflective at the second Stokes-shifted wavelength of the Raman medium 608 and highly reflective at the final output wavelength $\lambda_2$. Second, the beamsplitter 606 could remain unchanged, and the mirror 614 could be highly reflective at both the first- and second-Stokes wavelengths of the medium 608 and at the wavelength corresponding to the combination of a second-Stokes shift in the medium 608 and a first-Stokes shift in the medium 610, but not to reflect at the wavelength corresponding to the first-order Stokes wavelength of both mediums 608-610. In other words, any undesired Stokes-shift combinations have low reflectivities at the mirrors 612-614, thereby preventing any significant build-up at those wavelengths, while the reflectivities are specified to favor desired Stokes-shift combinations.

In FIG. 6, the optical paths through the Raman media 608-610 are shown as generally being arranged orthogonally to one another. This is merely for illustration. Other arrangements of the Raman media 608-610 could also be used. For instance, an additional mirror could be placed below the beamsplitter 606 in FIG. 6 to redirect light, and the Raman medium 610 and mirror 614 could be placed in a path parallel to the path through the Raman medium 608 and mirror 612. This could help to reduce the size of the resonator 600.

In some applications, a multi-media Raman generator may need to generate an output beam having a very narrow spectral bandwidth. For example, an output beam may require a specific wavelength with a tolerance of $10^{-5}$. As a result, one or more filters can be used to limit light to specific wavelengths or very narrow wavelength ranges. Moreover, such an implementation could use a tunable laser, which may necessitate the use of a tunable filter.

Figure 7:
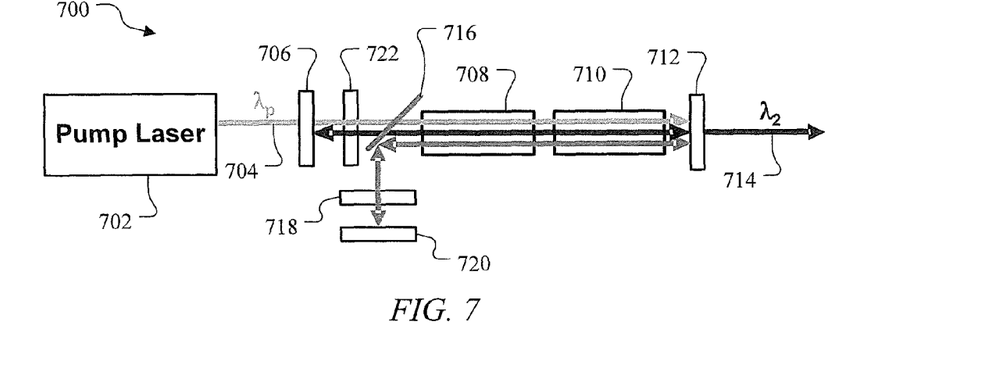
FIG. 7 illustrates a third example multi-media Raman resonator in accordance with this disclosure.

FIG. 7 illustrates a third example multi-media Raman resonator 700 in accordance with this disclosure. The Raman resonator 700 in FIG. 7 is similar in structure to the Raman resonator 500 of FIG. 5, and components 702-714 in FIG. 7 may be the same as or similar to the corresponding components 502-514 in FIG. 5.

As noted above, in some applications, the wavelength of the shifted output beam 714 needs to be precisely controlled. Ideally, this could be done using a single filter in the resonator 700 that precisely filters light at both the first Stokes-shifted wavelength $\lambda_1$ and the second Stokes-shifted wavelength $\lambda_2$. However, such a filter is difficult if not impossible to design. Instead, multiple filters can be used as shown in FIG. 7. Here, a dichroic beamsplitter 716 is inserted between the mirror 706 and the Raman medium 708. The dichroic beamsplitter 716 is reflective to light at the first Stokes-shifted wavelength $\lambda_1$ and redirects this light towards a filter 718 and a mirror 720. The filter 718 can precisely filter the received light at the first Stokes-shifted wavelength $\lambda_1$ to ensure that it has a precise wavelength or falls within a very narrow wavelength range. The mirror 720 then reflects the filtered light back towards the Raman media 708-710 for further amplification. The dichroic beamsplitter 716 is also substantially transmissive (such as about 100%) at both the pump wavelength $\lambda_p$ and the second Stokes-shifted wavelength $\lambda_2$. As a result, light at the second Stokes-shifted wavelength $\lambda_2$ passes through the dichroic beamsplitter 716 to a second filter 722, which can precisely filter the received light at the second Stokes-shifted wavelength $\lambda_2$ to ensure that it has a precise wavelength or falls within a very narrow wavelength range. The mirror 706 is substantially reflective (such as about 100%) at the second Stokes-shifted wavelength $\lambda_2$.

In this way, different filters can be used at the different Stokes-shifted wavelengths $\lambda_1$ and $\lambda_2$. Each filter 718 and 722 includes any suitable structure for filtering light in a narrow passband. Example types of filters could include etalons, Lyot filters, or diffraction gratings. Moreover, as noted above, the filters 718 and 722 could be tunable to support the use of a tunable pump laser 702.

Figure 8:
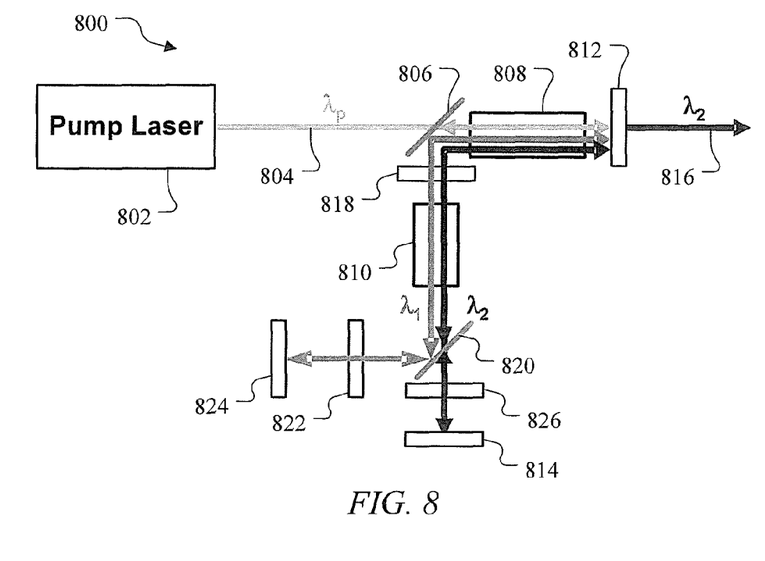
FIG. 8 illustrates a fourth example multi-media Raman resonator in accordance with this disclosure.

FIG. 8 illustrates a fourth example multi-media Raman resonator 800 in accordance with this disclosure. The Raman resonator 800 is similar to the Raman resonator 600 in FIG. 6, and components 802-818 in FIG. 8 may be the same as or similar to the corresponding components 602-618 in FIG. 6.

The Raman resonator 800 also includes a similar modification as that shown in FIG. 7. Namely, a dichroic beamsplitter 820 is inserted between the mirror 814 and the Raman medium 810. The dichroic beamsplitter 820 is reflective to light at the first Stokes-shifted wavelength $\lambda_1$ and redirects this light towards a filter 822 and a mirror 824. The filter 822 can precisely filter the received light to ensure that it has a precise wavelength or falls within a very narrow wavelength range. The mirror 824 then reflects the filtered light back towards the Raman media 808-810. The dichroic beamsplitter 820 is also substantially transmissive (such as about 100%) at the second Stokes-shifted wavelength $\lambda_2$. As a result, light at the second Stokes-shifted wavelength $\lambda_2$ passes through the dichroic beamsplitter 820 to a second filter 826, which can precisely filter the received light to ensure that it has a precise wavelength or falls within a very narrow wavelength range. The mirror 814 is substantially reflective (such as about 100%) at the second Stokes-shifted wavelength $\lambda_2$. In this way, different filters can be used at the different Stokes-shifted wavelengths $\lambda_1$ and $\lambda_2$.

Figure 9:
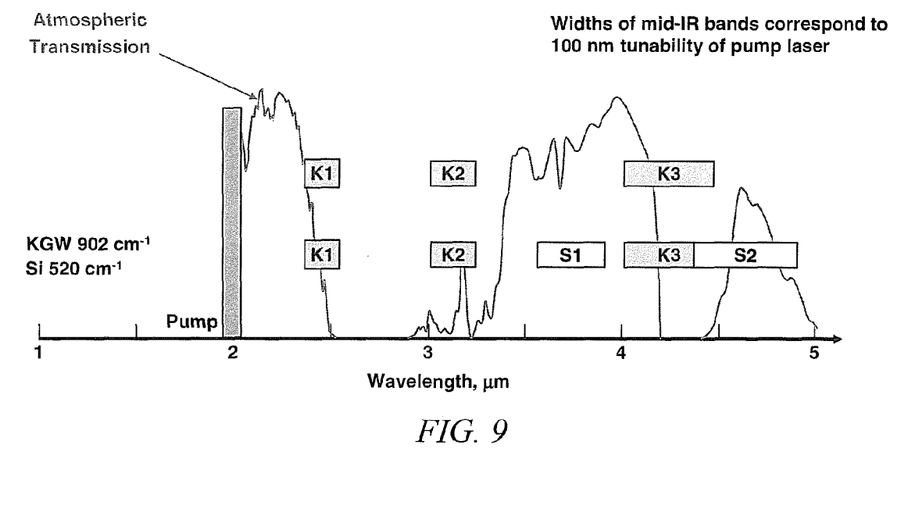
FIG. 9 illustrates example accessible wavelengths for a multi-media Raman resonator in accordance with this disclosure.

FIG. 9 illustrates example accessible wavelengths for a multi-media Raman resonator in accordance with this disclosure. In particular, FIG. 9 illustrates example accessible wavelengths for the multi-media Raman resonator 600 using a KGW Raman medium 608 and a silicon Raman medium 610. In this example, the KGW Raman medium 608 generates one or more shifts (one at a time), and the silicon Raman medium 610 generates more shifts with different spacing. Also, the silicon Raman medium 610 only receives light at wavelengths longer than its absorption edge at 2.2 µm.

The multi-media Raman resonators 500-800 shown here differ from conventional tandem or cascaded Raman resonators in that they generate, using multiple Raman media, an output beam where a significant portion of the output power in the output beam is spectrally concentrated at a single dominant output wavelength. The "significant portion" could represent about 50% or more of the output power, meaning at least about a majority of the power in the output beam is concentrated at a single output wavelength. In contrast, the conventional resonators generate multiple simultaneous wavelengths with a much more distributed output power. The Raman resonators 500-800 therefore spectrally concentrate the output power in a narrower wavelength range. Moreover, the fact that one or more of the Raman media might highly absorb at one or more of the wavelengths present in the Raman resonators can be handled using appropriate filtering as was discussed above in relation to FIG. 6.

Note that in the multi-media Raman resonators 500-800, the pump lasers can be tunable and output the pump beams at different pump wavelengths $\lambda_p$. As a result, the multi-media Raman resonators 500-800 could generate output beams that also have tunable wavelengths. In particular embodiments, this could allow the resonators 500-800 to be used in applications requiring multiple wavelengths in the mid-infrared wavelength range, such as from about 2 µm to about 5 µm.

Although FIGS. 5 through 8 illustrate example multi-media Raman resonators, various changes may be made to FIGS. 5 through 8. For example, the wavelength, transmission, and reflectivity values given above are approximate values only and are provided merely as examples. Moreover, the number of passes through each Raman medium could vary depending on the implementation. Although FIG. 9 illustrates one example of accessible wavelengths for a multi-media Raman resonator, various changes may be made to FIG. 9. For instance, other multi-media Raman resonators using different Raman media can have different accessible wavelengths.

Figure 10:
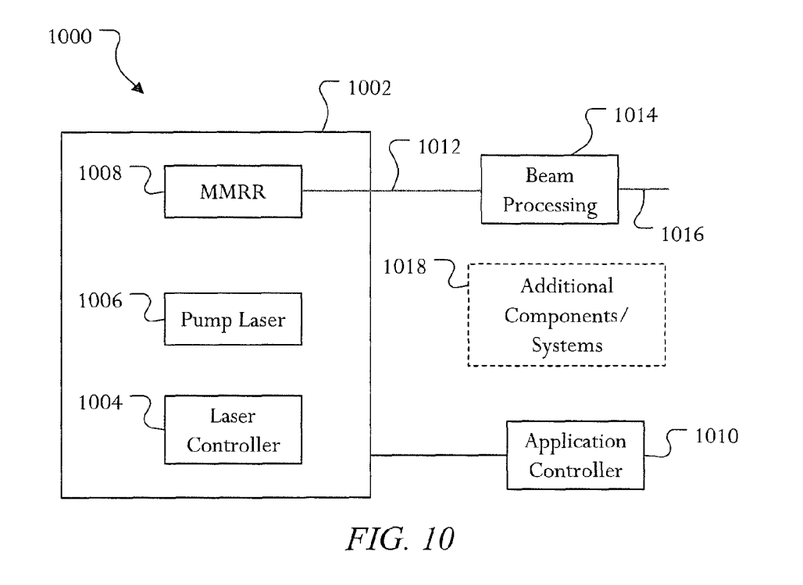
FIG. 10 illustrates an example system incorporating a multi-media Raman resonator in accordance with this disclosure.

FIG. 10 illustrates an example system 1000 incorporating a multi-media Raman resonator in accordance with this disclosure. As shown in FIG. 10, the system 1000 includes a laser subsystem 1002 having a laser controller 1004, a pump laser 1006, and a multi-media Raman resonator (MMRR) 1008. The pump laser 1006 and the Raman resonator 1008 could have any of the structures shown in FIGS. 5 through 8. The laser controller 1004 controls the operation of the laser subsystem 1002, such as by controlling the operation of the pump laser 1006. As particular examples, based on control signals from an application controller 1010, the laser controller 1004 may be configured to turn the pump laser 1006 on and off.

The application controller 1010 is configured to perform various operations to support one or more applications that involve the use of the laser subsystem 1002. The multi-media Raman resonators shown in FIGS. 5 through 8 could find use in a wide variety of applications, such as environmental sensing, remote spectroscopy, light detection and ranging (LIDAR), directional infrared countermeasures (DIRCM), and laser communications. The operations performed by the application controller 1010 can vary depending on which application or applications are being supported by the system 1000.

In this example, the laser subsystem 1002 generates a shifted output beam 1012 having a longer wavelength than the beam generated by the pump laser 1006. The beam 1012 is provided to beam processing components 1014, which handle and/or modify the beam 1012 to create a final output beam 1016. The beam processing components 1014 could perform any desired operations on the beam 1012 depending on the application. For example, the beam processing components 1014 could include a telescope with an output mirror for directing the beam 1016 in a particular direction or towards a specified target.

One or more additional components/systems 1018 support any other necessary or desired features to be used in particular applications with the laser subsystem 1002. For example, in a DIRCM application, a laser can be used to help protect aircraft from heat-seeking missiles. In this application, the additional components/systems 1018 could include an acquisition and tracking system used to identify and track an incoming missile or other target. Location information can be used by the system 1000 to direct the output beam 1016 towards the incoming missile, ideally to defeat the infrared tracking mechanism of the incoming missile or other target. In a laser communication system, the additional components/systems 1018 could include a system for generating or obtaining data to be transmitted using the output beam 1016. Any other suitable components or systems can be used in conjunction with the laser subsystem 1002.

Although FIG. 10 illustrates one example of a system 1000 incorporating a multi-media Raman resonator, various changes may be made to FIG. 10. For example, the makeup and arrangement of the system 1000 are for illustration only. Components could be added, omitted, combined, subdivided, or placed in any other suitable configuration according to particular needs. Also, FIG. 10 illustrates one environment in which a multi-media Raman resonator may be implemented. However, a multi-media Raman resonator may be used in any other suitable system.

Figure 11:
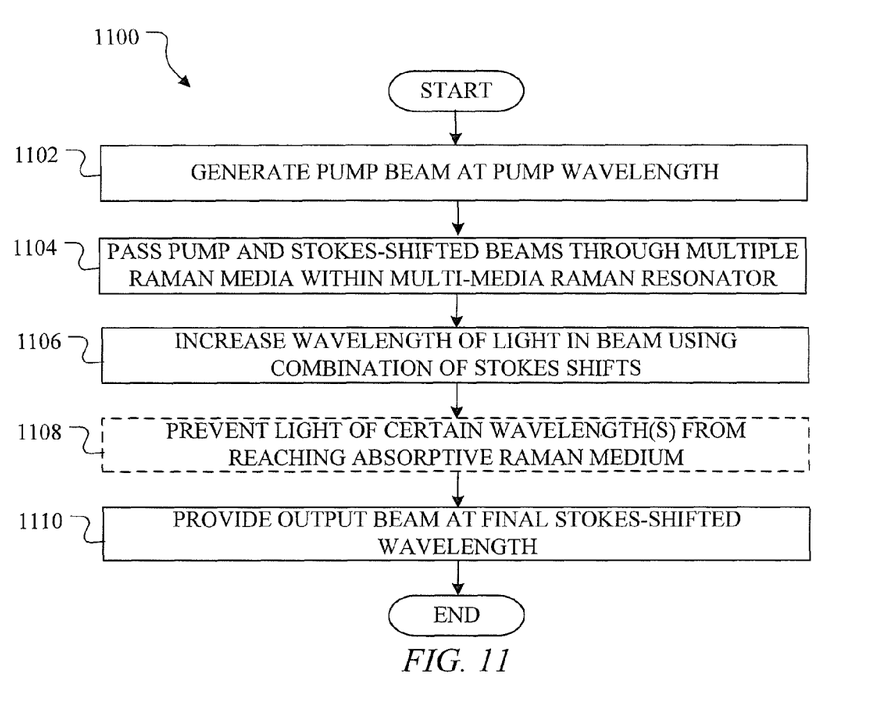
FIG. 11 illustrates an example method for using a multi-media Raman resonator in accordance with this disclosure.

FIG. 11 illustrates an example method 1100 for using a multi-media Raman resonator in accordance with this disclosure. As shown in FIG. 11, a pump beam at a pump wavelength is generated at step 1102. This could include, for example, a pump laser generating a pump beam at a pump wavelength $\lambda_p$. Any suitable pump laser could be used here, and the pump beam could have any suitable pump wavelength $\lambda_p$. In particular embodiments, the pump wavelength $\lambda_p$ is about 2 µm.

The pump beam and various Stokes-shifted beams are passed through multiple Raman media within a multi-media Raman resonator at step 1104. This could include, for example, passing each of the pump beam and various Stokes-shifted beams through at least one of the Raman media 508-510, 608-610, 708-710, 808-810 one or more times. In this manner, the wavelength of the light in the pump beam increases due to a combination of Stokes shifts at step 1106. This increases the light's wavelength from the pump wavelength $\lambda_p$ through at least first and second Stokes-shifted wavelengths $\lambda_1$ and $\lambda_2$. In particular embodiments, the pump wavelength $\lambda_p$ increases from about 2 µm to about 2.4 µm and then to about 2.9 µm. As noted above, one or more multiple Stokes frequency shifts could occur in each Raman medium. Optionally, light at one or more wavelengths are prevented from reaching an absorptive Raman medium at step 1108. This could include, for example, using the filter 618, 818 to prevent absorption at the pump wavelength $\lambda_p$ or any Stokes-shifted wavelengths $\lambda_1$ and $\lambda_2$, helping to prevent termination of the wavelength cascade at the absorbing wavelength(s).

An output beam is provided at a final Stokes-shifted wavelength at step 1110. This could include, for example, the output beam exiting the resonator through a mirror. Ideally, the output beam includes energy at a desired Stokes-shifted wavelength only, with essentially no output power at any other combination of Stokes shifts.

Although FIG. 11 illustrates one example of a method 1100 for using a multi-media Raman resonator, various changes may be made to FIG. 11. For example, while shown as a series of steps, various steps in FIG. 11 can overlap, occur in parallel, or occur any number of times.

Note that in the above description, mention is often made of a "wavelength" (such as wavelength $\lambda_p$, $\lambda_s$, $\lambda_1$ or $\lambda_2$). Of course, one skilled in the art will recognize that these references refer to either a single wavelength or multiple wavelengths within a single narrow wavelength band. Also, in the multi-media Raman resonators 500-800, the Raman media are said to be "optically located" between mirrors when light reflecting between those mirrors passes through the Raman media.

It may be advantageous to set forth definitions of other certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A laser system comprising:
a multi-media Raman resonator using two or more distinct Raman Media, configured to receive a pump beam and generate an output beam, the multi-media Raman resonator comprising multiple mirrors and multiple Raman media optically located between the mirrors;
wherein output power in the output beam is spectrally concentrated around a single dominant wavelength that is longer than a pump wavelength; and
wherein the longer wavelength of the output beam is associated with a combination of at least one Stokes shift associated with each of the individual Raman media.

2. The laser system of claim 1, wherein:
the Raman media comprise first and second Raman media arranged in series;
at least a first of the mirrors is substantially transmissive at a pump wavelength and substantially reflective at first and second Stokes-shifted wavelengths, the first and second Stokes-shifted wavelengths associated with cumulative Stokes shifts provided by the first and second Raman media, respectively; and
at least a second of the mirrors is substantially reflective at the first Stokes-shifted wavelength and partially transmissive at the second Stokes-shifted wavelength.

3. The laser system of claim 1, wherein:
the Raman media comprise first and second Raman media;
at least a first of the mirrors is substantially reflective at a pump wavelength and a first Stokes-shifted wavelength and partially transmissive at a second Stokes-shifted wavelength, the first and second Stokes-shifted wavelengths associated with cumulative Stokes shifts provided by the first and second Raman media, respectively; and
at least a second of the mirrors is substantially reflective at the first and second Stokes-shifted wavelengths.

4. The laser system of claim 3, further comprising:
a dichroic beamsplitter configured to receive the pump beam and to transmit at least a portion of the pump beam towards the first Raman medium and the first mirror, the dichroic beamsplitter also configured to transmit at least a portion of the pump beam reflected by the first mirror and to reflect light at other wavelengths from the first mirror toward the second Raman medium and the second mirror.

5. The laser system of claim 3, further comprising:
a filter configured to absorb light at a wavelength that is absorbed by one of the Raman media or to redirect light at the wavelength absorbed by one of the Raman media away from that Raman medium.

6. The laser system of claim 1, wherein:
a first of the Raman media provides partial coverage of a specified output spectral range, leaving a gap in the specified spectral range; and
a second of the Raman media provides coverage in at least part of the gap.

7. A laser system comprising:
a multi-media Raman resonator, configured to receive a pump beam and generate an output beam, the multi-media Raman resonator comprising multiple mirrors and multiple Raman media optically located between the mirrors;
wherein output power in the output beam is spectrally concentrated around a single dominant wavelength that is longer than a pump wavelength;
wherein the longer wavelength of the output beam is associated with a combination of at least one Stokes shift associated with each of the individual Raman media;
first and second filters configured to filter light at different wavelengths; and
a dichroic beamsplitter configured to direct light at a first Stokes-shifted wavelength to the first filter and to direct light at a second Stokes-shifted wavelength to the second filter, the first and second Stokes-shifted wavelengths associated with cumulative Stokes shifts provided by the first and second Raman media, respectively.

8. The laser system of claim 1, wherein:
the pump beam has a pump wavelength of about 2 μm; and
the multi-media Raman resonator is configured to shift the pump beam to about 2.4 μm and then to about 2.9 μm.

9. A system comprising:
a laser configured to generate a pump beam at a pump wavelength; and
a multi-media Raman resonator configured to receive the pump beam and generate an output beam, the multi-media Raman resonator comprising multiple mirrors and multiple Raman media using two or more distinct Raman Media optically located between the mirrors;
wherein output power in the output beam is spectrally concentrated around a single dominant wavelength that is longer than a pump wavelength; and wherein the longer wavelength of the output beam is associated with a combination of at least one Stokes shift associated with each of the individual Raman media.

10. The system of claim 9, wherein:
the Raman media comprise first and second Raman media arranged in series;
at least a first of the mirrors is substantially transmissive at a pump wavelength and substantially reflective at first and second Stokes-shifted wavelengths, the first and second Stokes-shifted wavelengths associated with cumulative Stokes shifts provided by the first and second Raman media, respectively; and
at least a second of the mirrors is substantially reflective at the first Stokes-shifted wavelength and partially transmissive at the second Stokes-shifted wavelength.

11. The system of claim 9, wherein:
the Raman media comprise first and second Raman media;
at least a first of the mirrors is substantially reflective at a pump wavelength and a first Stokes-shifted wavelength and partially transmissive at a second Stokes-shifted wavelength, the first and second Stokes-shifted wavelengths associated with cumulative Stokes shifts provided by the first and second Raman media, respectively; and
at least a second of the mirrors is substantially reflective at the first and second Stokes-shifted wavelengths.

12. The system of claim 11, wherein the multi-media Raman resonator further comprises:
a dichroic beamsplitter configured to receive the pump beam and to transmit at least a portion of the pump beam towards the first Raman medium and the first mirror, the dichroic beamsplitter also configured to transmit at least a portion of the pump beam reflected by the first mirror and to reflect light at other wavelengths from the first mirror toward the second Raman medium and the second mirror.

13. The system of claim 11, wherein the multi-media Raman resonator further comprises:
a filter configured to absorb light at a wavelength that is absorbed by one of the Raman media or to redirect light at the wavelength absorbed by one of the Raman media away from that Raman medium.

14. The system of claim 9, further comprising:
a laser controller configured to control the laser.

15. The system of claim 9, further comprising:
an acquisition and tracking system configured to track a target; and
beam processing components configured to direct the output beam towards the target.

16. The system of claim 9, wherein:
the laser is tunable and configured to vary the pump wavelength of the pump beam; and
the multi-media Raman resonator is configured to generate the output beam at varying wavelengths in a mid-infrared wavelength range.

17. A method comprising:
receiving a pump beam at a pump wavelength; and
generating an output beam using a multi-media Raman resonator, the multi-media Raman resonator comprising multiple mirrors and multiple Raman media using two or more distinct Raman Media optically located between the mirrors;
wherein output power in the output beam is spectrally concentrated around a single dominant wavelength that is longer than a pump wavelength; and
wherein the longer wavelength of the output beam is associated with a combination of at least one Stokes shift associated with each of the individual Raman media.

18. The method of claim 17, wherein:
the Raman media comprise first and second Raman media arranged in series;
at least a first of the mirrors is substantially transmissive at a pump wavelength and substantially reflective at first and second Stokes-shifted wavelengths, the first and second Stokes-shifted wavelengths associated with cumulative Stokes shifts provided by the first and second Raman media, respectively; and
at least a second of the mirrors is substantially reflective at the first Stokes-shifted wavelength and partially transmissive at the second Stokes-shifted wavelength.

19. The method of claim 17, wherein:
the Raman media comprise first and second Raman media;
at least a first of the mirrors is substantially reflective at a pump wavelength and a first Stokes-shifted wavelength and partially transmissive at a second Stokes-shifted wavelength, the first and second Stokes-shifted wavelengths associated with cumulative Stokes shifts provided by the first and second Raman media, respectively; and
at least a second of the mirrors is substantially reflective at the first and second Stokes-shifted wavelengths.

20. The method of claim 19, further comprising at least one of:
absorbing light at a wavelength that is absorbed by one of the Raman media; and
redirecting light at the wavelength absorbed by one of the Raman media away from that Raman medium.

* * * * *